United States Patent [19]

Windross

[11] Patent Number: 5,295,047
[45] Date of Patent: Mar. 15, 1994

[54] LINE-OF-LIGHT ILLUMINATING DEVICE
[75] Inventor: Gene R. Windross, Westland, Mich.
[73] Assignee: Ford Motor Company, Dearborn, Mich.
[21] Appl. No.: 863,888
[22] Filed: Apr. 6, 1992
[51] Int. Cl.[5] .............................................. G01D 11/28
[52] U.S. Cl. ...................................... 362/26; 362/31; 362/32; 362/339; 385/146
[58] Field of Search ...................... 362/26, 29, 30, 31, 362/32, 299, 339, 327, 328; 385/33, 146, 36; 359/641, 833

[56] References Cited

U.S. PATENT DOCUMENTS

| | | | |
|---|---|---|---|
| 2,825,260 | 3/1958 | O'Brien | 88/1 |
| 3,131,496 | 5/1964 | Schropp | 362/31 |
| 3,636,915 | 1/1972 | Ruppert | 362/30 |
| 3,676,667 | 7/1972 | Malifaud | 362/301 |
| 4,389,698 | 6/1983 | Cibie | 362/32 |
| 4,677,531 | 6/1987 | Szeles . | |
| 4,693,556 | 9/1987 | McGaughan, Jr. | 362/32 |
| 4,729,621 | 3/1988 | Edelman | 385/33 |
| 4,733,332 | 3/1988 | Yamashita et al. | 362/32 |
| 4,737,004 | 4/1988 | Amitay et al. | 385/33 |
| 4,761,047 | 8/1988 | Mori | 350/96.1 |
| 4,763,984 | 8/1988 | Awai et al. | 350/96.24 |
| 4,826,273 | 5/1989 | Tinder et al. | 362/32 |
| 4,872,093 | 10/1989 | Shimizu | 362/30 |
| 4,916,592 | 4/1990 | Sultan et al. | 362/32 |
| 4,929,070 | 5/1990 | Yokota et al. | 385/33 |
| 5,001,609 | 3/1991 | Gardner et al. | 362/32 |
| 5,181,263 | 1/1993 | Derfiny | 385/33 |

FOREIGN PATENT DOCUMENTS

| | | | |
|---|---|---|---|
| 0135652 | 11/1978 | Japan | 385/33 |
| 0127605 | 5/1990 | Japan | 385/33 |

Primary Examiner—Richard R. Cole
Assistant Examiner—Y. Quach
Attorney, Agent, or Firm—Roger L. May; Damian Porcari

[57] ABSTRACT

A line-of-light illuminating device includes an optical lightpipe for receiving and transmitting light by internal reflection and an integral optical lens located at an emission portion of the lightpipe for focusing the reflected light into a collimated line-of-light beam. The lightpipe and lens are preferably injection molded in a single shot as a unitary device. The lightpipe preferably has an isosceles triangular cross-sectional shape with an apex formed at the point where the two equilateral sides join. A reflective surface is formed along the apex on the emission portion of the lightpipe, and the lens is located on the side opposite the apex. The internally reflected light striking the reflective surface is reflected perpendicularly therefrom to the lens. The lens focusses the reflected light into the collimated line-of-light beam.

19 Claims, 2 Drawing Sheets

LINE-OF-LIGHT ILLUMINATING DEVICE

CROSS-REFERENCE TO RELATED APPLICATION

Reference is hereby made to a copending patent application, by the same applicant and assigned to the same assignee, disclosing related subject matter entitled "Fiberoptic Line-Of-Light Illuminating Device", U.S. Ser. No. 810,840, filed Dec. 20, 1991.

BACKGROUND OF THE INVENTION

The present invention relates generally to lighting systems and, more particularly, to a line-of-light illuminating device employing an optical lightpipe for transmitting light by internal reflection and an integral optical lens located at an emission portion of the lightpipe for focusing the reflected light into a collimated line-of-light beam.

It is well known in the field of fiber optics that optical fibers are capable of effectively and efficiently conducting light from a single source along nonlinear paths to various locations remote from the light source without encountering substantial transmission losses. Because of this capability, there is increasing interest in the application of optical fibers to uses where space is restricted. One such use is the overall illumination needs of vehicles where space is scarce due to aerodynamic and styling considerations.

One general approach to the application of optical fibers to vehicular illumination needs is proposed in U.S. Pat. No. 4,811,172 to Davenport et al., U.S. Pat. No. 4,868,718 to Davenport et al., U.S. Pat. No. 4,949,227 to Finch et al., and U.S. Pat. No. 4,958,263 to Davenport et al., all assigned to General Electric Company. These patents disclose various lighting systems that basically employ a plurality of optical fibers having their respective input ends coupled to a high intensity common light source and their respective output ends individually coupled to respective ones of a plurality of paired apertures and optical lenses. Thus, the operative principle underlying this approach is to use one lens and one aperture per optical fiber.

Another approach is shown in my copending application Ser. No. 810,840, wherein there is disclosed a fiberoptic line-of-light illuminating device having a fiberoptic cable providing a plurality of optical fiber bundles, a housing including a block which encapsulates output ends of the optical fibers in splayed-out fashion to form a thin elongated line, and a single optical lens such as a cylindrical lens. The approach shown in my copending application has a number of advantages over the systems discussed above in terms of being substantially miniaturized, easier to assemble, easier to align and less likely to become unaligned than the one-lens-per-optic fiber system. Still, encapsulating a splay of optical fibers presents some manufacturing challenges. It would, therefore, be desirable to form a line-of-light illuminating device from a single lightpipe and optical lens.

Of course lightpipes as such are known. See, for example, Yamashita U.S. Pat. No. 4,733,332 which shows a light transmitting rod illuminated at one end, O'Brien U.S. Pat. No. 2,825,260 which shows a triangular lightpipe amongst other shapes, and Mori U.S. Pat. No. 4,678,279 which shows a modified cylindrical light conducting member. However, the lightpipes shown in these prior patents are generally not capable of being used to provide a line-of-light beam nor are they useful in meeting the overall illumination requirements of vehicles. Thus, there is a need for a line-of-light illuminating device that will satisfy the overall illumination requirements of vehicles while avoiding the aforementioned major shortcomings.

SUMMARY OF THE INVENTION

This need is met by the line-of-light illuminating device of the present invention. The operative principle underlying the present invention is to use an optical lightpipe having an elongated main portion for transmitting light by internal reflection and a light emission portion of the lightpipe for transmitting the reflected light to an integral optical lens to form a collimated line-of-light beam. The lightpipe of the illuminating device constructed in accordance with the operative principle of the present invention can be injection molded plastic one and preferably a unitary illuminating device, with both a lightpipe and a lens being formed in a single injection molding process. The body of the lightpipe has a controlled cross-sectional shape which preferably is an isosceles triangular cross-sectional shape with an apex at the point joining the two equilateral sides. After injection molding, the apex of the emission portion of the lightpipe may be scratched or grooved and metallized to provide a reflective surface. The internally reflected light striking the reflective surface is reflected in a substantially perpendicular direction therefrom through the light emission portion of the lightpipe. The integral optical lens associated with the light emission portion of the lightpipe is preferably a single cylindrical one or a series of spherical ones aligned along the light emission portion of the lightpipe. The lens may also be of a plastic material and formed with the lightpipe during injection molding so as to produce a unitary device as is preferred or alternately may be separately formed and integrally joined with the lightpipe by known means such as by a clear adhesive.

It is thus a feature of the present invention to provide a line-of-light illuminating device using an elongated optical lightpipe having an elongated main body with a longitudinal axis and a pair of spaced opposite ends; to provide the main body of the lightpipe with an input end surface at one of the opposite ends thereof for receiving light; to provide the main body of the lightpipe with a controlled cross-sectional shape for transmitting the received light via internal reflection from the input end surface at the one opposite end toward the other of the opposite ends thereof; to provide the illuminating device having means defining a reflective surface along an apex of an emission portion of the main body of the lightpipe for receiving the light transmitted from the input end surface and reflecting the light in a substantially perpendicular direction; and to provide the illuminating device having an integral optical lens disposed at a side of the emission portion of the main body of the lightpipe and with a central axis spaced from and extending parallel to the longitudinal axis of the main body of the lightpipe and spaced from and extending parallel to the reflective surface for receiving the reflected light from the reflective surface and focusing the light into a collimated line-of-light beam.

An advantage of the present line-of-light illuminating device in addition to the space saving features, is its ease of assembly and alignment. A single device having an integral lens is easier to assemble, easier to align, and less likely to become unaligned than the one-lens-peroptic fiber systems. A particular advantage of the preferred embodiment of the present invention is its ease of manufacture in that an integral, unitary illuminating device having both a lightpipe and a lens may be formed in a single injection molding process. In addition because the light source may be remotely located from the illuminating device, the line-of-light illuminating device of the present invention is especially adapted for use in vehicle lighting systems where space is limited.

Other features and advantages of the invention will become apparent from the following description, the accompanying drawings and the appended claims.

DETAILED DESCRIPTION OF THE PREFERRED EMBODIMENT

Figure 1:
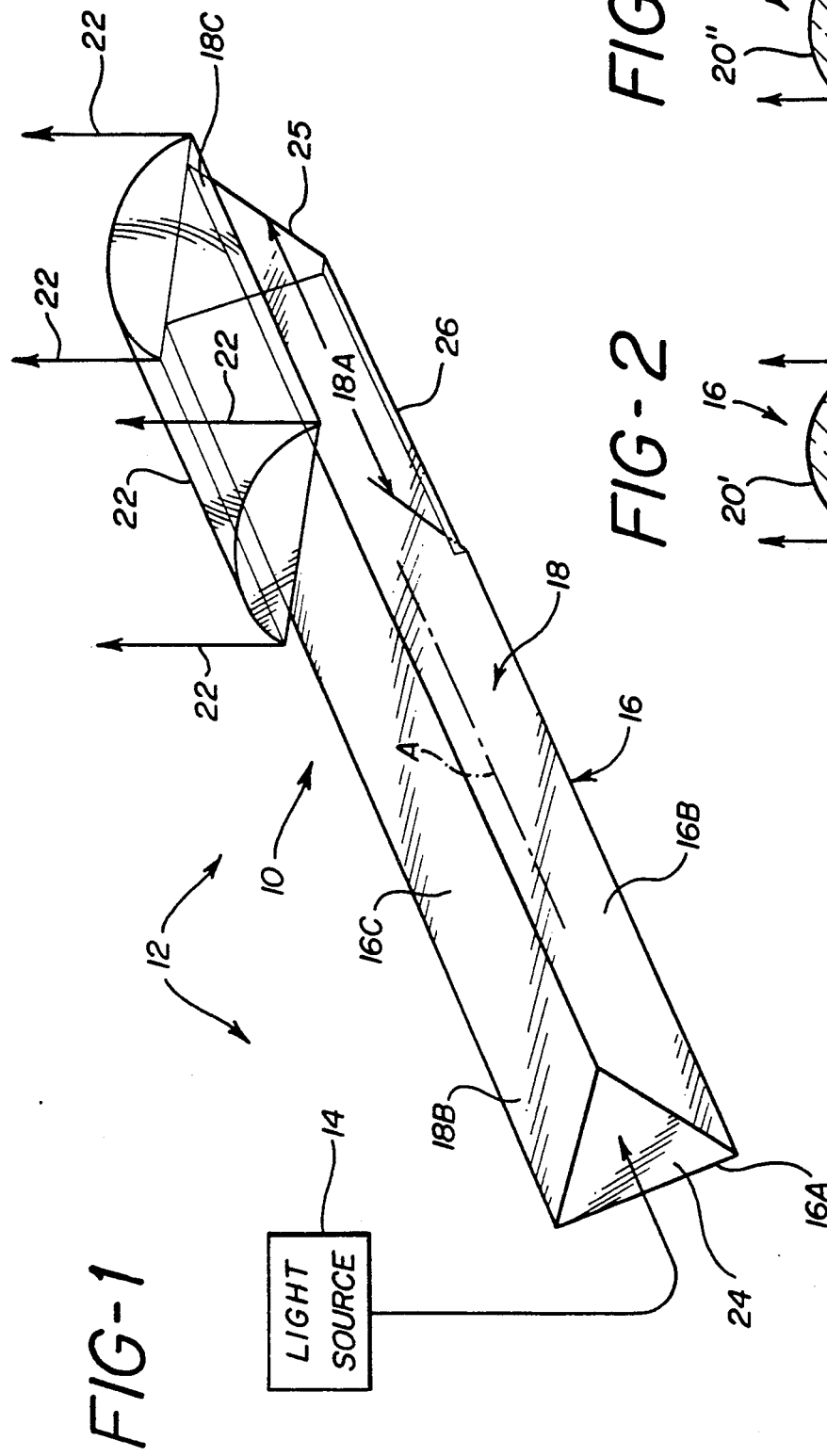
FIG. 1 is a schematic representation of a line-of-light illuminating device constructed in accordance with the operative principle of the present invention.

Referring to FIG. 1 of the drawings, there is illustrated a schematic representation of a line-of-light illuminating device, generally designated 10, having a construction in accordance with the operative principle of the present invention. The illuminating device 10 of the present invention is generally applicable to a variety of lighting applications, such as for vehicular illumination purposes. Examples are headlights, foglights, parking lights, turnsignal lights, cornering lights, backup lights, dome lights, map lights, etc. The device 10 can function in an environment where space is limited and the light source is located remotely from the device. A preferred embodiment of the line-of-light illuminating device 10 in the form of a vehicular headlight is illustrated in FIG. 1.

The illuminating device 10 is part of a lighting system, indicated by the numeral 12, which has a light source 14 coupled in a well-known conventional way, such as by use of fiberoptic cable, to the device 10. Any suitable light source 14 can be utilized, such as the one described in my copending application Ser. No. 810,840, filed Dec. 20, 1991 which in turn refers to my earlier application Ser. No. 656,919, filed Feb. 19, 1991, which disclosures are incorporated herein by reference.

Referring now to FIG. 1, the illuminating device 10 basically includes an optical lightpipe 16 having an elongated main body 18 for transmitting light through its length by internal reflection and an integral optical lens 20 located at emission portion 18A of the main body 18 of the lightpipe 16 for focusing the reflected light into a collimated line-of-light beam whose theoretical corners are shown by arrows 22. The elongated main body 18 of the lightpipe 16 has a longitudinal axis "A" and a pair of spaced opposite ends 18B, 18C An input end surface 24 is formed at the one opposite end 18B of the elongated main body 18 and coupled in a conventional manner such as by a fiberoptic cable to the light source 14 for receiving light therefrom. Lightpipe 16 may be formed of transparent acrylic or epoxy material; alternatively it may be a liquid-filled lightpipe. The elongated main body 18 of the lightpipe 16 preferably has a uniform controlled cross-sectional shape, which may be an isosceles triangular shape, with sides 16A and 16B being equilateral and forming an apex along the line at which sides 16A and 16B join and having a side 16C for transmitting by internal reflection the received light lengthwise through the transparent interior of the main body 18 from the input end surface 24 toward end surface 25 at the other opposite end 18C of the main body 18.

The illuminating device 10 also includes means defining a reflective surface 26 along the apex of the emission portion 18A of the elongated main body 18 of the lightpipe 16 adjacent to the other opposite end 18C thereof. The reflective surface 26 on the apex of the main body 18 along the emission portion 18A has the configuration of an elongated thin line. Preferably, the lower edge of the emission portion 18A of the lightpipe main body 18 is grooved, such as in a serrated, saw-toothed pattern across the apex over the whole length of the emission portion 18A, and metallized to form the reflective surface 26 in a known manner for example by hot stamping bright (i.e. using a heated platten to apply a metal foil), vacuum metallizing, or vapor deposition. Generally, any grooving or cutting tool useful with acrylic or epoxy materials may be used. When a liquid-filled lightpipe is used the metallized surface may be created by placing or forming a metal insert at an apex of the hollow body prior to filling the hollow body with liquid. In any event, reflective surface 26 receives the light transmitted by internal reflection through the main body 18 from the input end surface 24 and reflects the light in a generally perpendicular direction relative to the reflective surface 26 therefrom towards the integral optical lens 20.

End surface 25 serves as a light blocking end and may be angled and also metallized so that light which bypasses the emission portion 18A strikes end surface 25 and reflects back along lightpipe main body 18 for additional multiple opportunities to exit through emission portion 18A.

Figure 4:
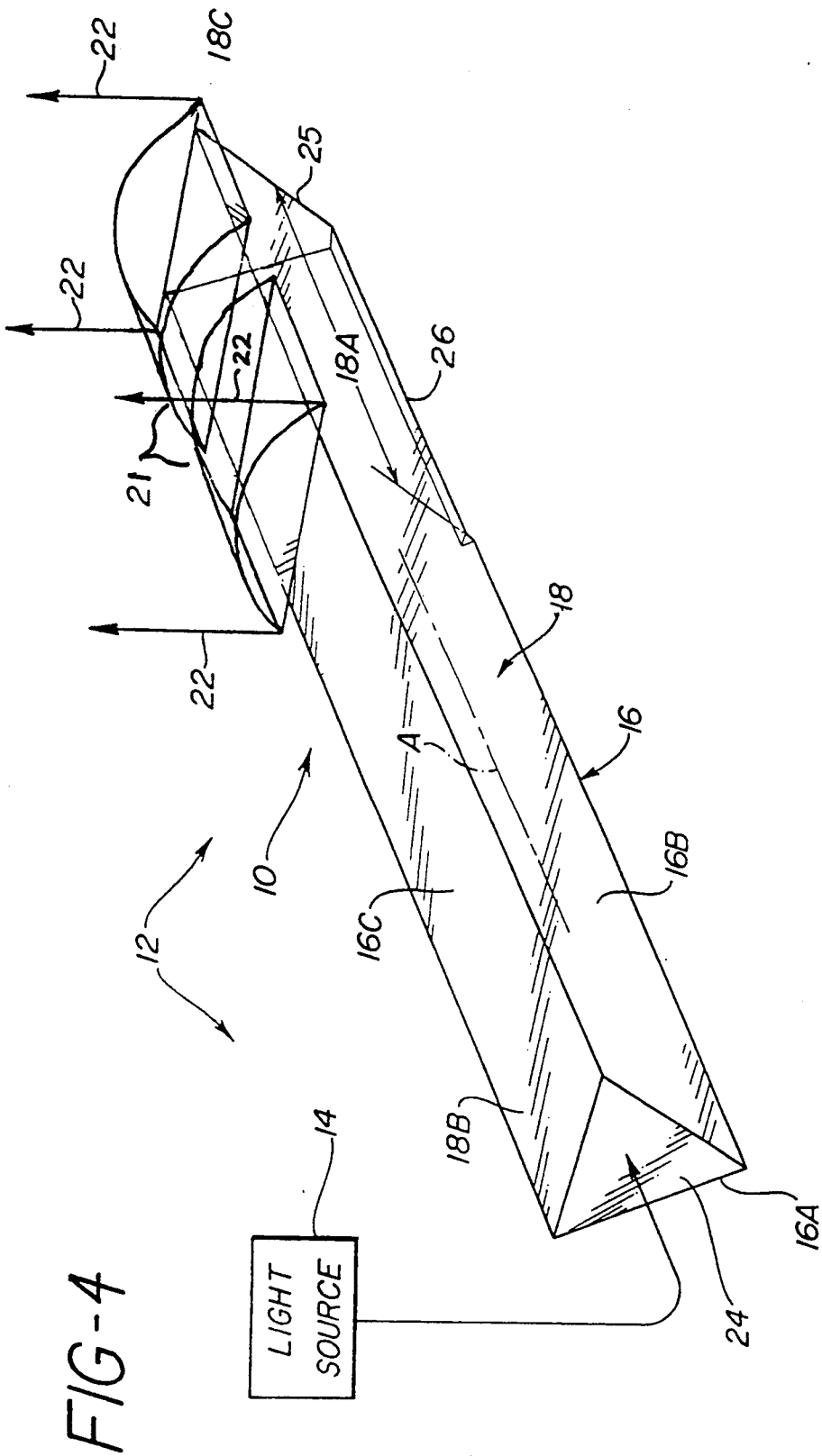
FIG. 4 is a schematic representation of a line-of-light illuminating device similar to the one shown in FIG. 1, but with a series of segments of individual spherical lens.

Preferably, the integral optical lens 20 is a single segment of a cylindrical lens as shown disposed on side 16C of the emission portion 18A of lightpipe main body 18 being opposite from the reflective surface 26 which is at the apex and focal point of the triangularly-shaped lightpipe. Alternatively, the integral optical lens may be a series of segments 21 of individual spherical lens aligned along the emission portion 18A of the lightpipe, as best illustrated in FIG. 4. FIG. 4 shows an alternative embodiment of the light-of-light illuminating device of the present invention in which the optical lens 20 of FIG. 1 is replaced by a series of spherical lens segments 21. All elements present in the embodiment shown in FIG. 1 are also present in the embodiment shown in FIG. 4, with the exception of single lens 20. Referring, again, to FIG. 1, the lens 20 is spaced from and longitudinally extends generally parallel to the longitudinal axis "A" of the lightpipe main body 18 and is also spaced from and longitudinally extends generally parallel to the reflective surface 26. In such position, the lens 20 receives the reflected light from the reflective surface 26 and focusses the light into the collimated line-of-light beam. Lens 20 may also be made of an acrylic or epoxy material. Lens 20 and lightpipe 16 may be formed separately and joined integrally together by various attachment means such as by use of a clear adhesive. When a liquid-filled lightpipe is used a separately formed lens or series of lenses is necessary. When a separately formed lens or series of lenses is used, integral optical lens 20 and lightpipe 16 need not be, but may be, made of the same material.

Figure 3:
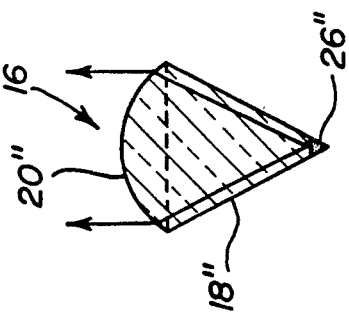
FIG. 3 is a cross-sectional view of another alternative shape of the emission portion of the lightpipe and the lens of a unitary illuminating device.
Figure 2:
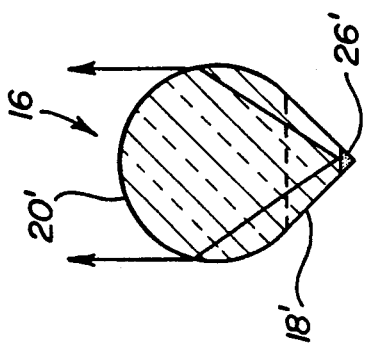
FIG. 2 is a cross-sectional view of an alternative shape of the emission portion of the lightpipe and the lens of a unitary illuminating device.

However, preferably lens 20 and lightpipe 16 are made of the same material and are injection molded integrally in a single shot process to form a unitary device. This is illustrated in FIGS. 2 and 3 wherein it can be seen that the emission portion 18A of the lightpipe main body 18 and lens 20 are formed as a unitary device. FIG. 2 illustrates a teardrop cross-sectional shape wherein lens 20' is essentially cylindrical and is a part of lightpipe main body 18'. FIG. 3 depicts a snow-cone cross-sectional shape wherein lens 20'' is essentially a segment of a cylindrical lens and is part of lightpipe main body 18''. In these preferred unitary embodiments, the non-emission portion of the lightpipe main body is still preferably triangular in shape.

In all embodiments, after lens 20 and lightpipe 16 are formed the apex of the emission portion 18A of the lightpipe main body 18 is scratched or grooved and metallized, as mentioned above, to provide the reflective surface 26. An example of a typical illuminating device 10 is as follows. Triangular lightpipe 16 may be 14 inches in length and its sides 16A and B may be 0.375 inches and side 16C 0.475 inches in width. The reflecting surface 26 may be 3¾ inches in length and 0.01 to 0.09 inches in width. The lens 20 may be 0.5 inches wide, 0.25 inches thick and 4 inches in length.

Having thus described the lightpipe line-of-light illuminating device of the present invention in detail and by reference to a preferred embodiment thereof, it will be apparent that modifications and variations are possible without departing from the scope of the invention defined in the appended claims.

What is claimed is:

1. A line-of-light illuminating device, comprising:
 a light source;
 an elongated optical lightpipe which receives light from said light source and transmits said light through internal reflection, said lightpipe being isosceles triangular in cross-section with an apex at the point at which the equilateral sides of the isosceles triangle join, said lightpipe having an emission portion; and
 an integral optical lens, located at one side of said emission portion of said lightpipe and extending substantially parallel to said emission portion for receiving and focusing said internally-reflected light into a collimated line-of-light beam, said emission portion of said lightpipe having a reflective surface formed at the apex thereof being opposite from said one side thereof for receiving said internally-reflected light striking said reflective surface and reflecting said light in a substantially perpendicular direction therefrom to said integral optical lens.

2. The line-of-light illuminating device of claim 1 wherein said lightpipe and lens are of a unitary construction.

3. The line-of-light illuminating device of claim 2 wherein said lightpipe and lens are formed together in a single injection molding process.

4. The line-of-light illuminating device of claim 1 wherein said reflective surface has a configuration of an elongated thin line.

5. The line-of-light illuminating device of claim 4 wherein the apex of said emission portion of said lightpipe is grooved and metallized to form said reflective surface.

6. The line-of-light illuminating device of claim 1 wherein said lightpipe has an elongated main body with a longitudinal axis and a pair of spaced opposite ends, said main body having an input end surface at one of said opposite ends for receiving light.

7. The line-of-light illuminating device of claim 1 wherein said integral optical lens is a segment of a single cylindrical lens.

8. The device of claim 1 wherein said optical lens has a central axis spaced from and extending generally parallel to a longitudinal axis of said lightpipe and spaced from and extending generally parallel to said reflective surface for receiving the reflected light from said reflective surface and focusing the light into a collimated line-of-light.

9. The line-of-light illuminating device of claim 1 wherein said integral optical lens is a series of segments of spherical lenses aligned along said one side of said emission portion.

10. The line-of-light illuminating device of claim 1 wherein said emission portion of said lightpipe and said lens have a unitary teardrop cross-sectional shape.

11. The line-of-light illuminating device of claim 1 wherein said emission portion of said lightpipe and said lens have a unitary snow-cone, cross-sectional shape.

12. A line-of-light illuminating device, comprising:
 an elongated optical lightpipe having an elongated main body with a longitudinal axis and a pair of spaced opposite ends, said main body of said lightpipe having an input end surface at one of said opposite ends for receiving light, said main body of said lightpipe having a triangular cross-sectional shape for transmitting the received light via internal reflection from said input end surface at one of said opposite ends toward another of said opposite ends;
 means defining a reflective surface along an apex of an emission portion of said main body of said lightpipe and adjacent to said other opposite end thereof, for receiving the light transmitted by internal reflection from said input end surface and reflecting the light in a generally perpendicular direction from said reflective surface; and
 an integral optical lens disposed on a side of said emission portion of said main body of said lightpipe being opposite from the apex, said lens having a central axis spaced from and extending generally parallel to said longitudinal axis of said main body of said lightpipe and spaced from and extending generally parallel to said reflective surface for receiving the reflected light from said reflective surface and focusing the light into a collimated line of light.

13. The line-of-light illuminating device of claim 2 wherein said lightpipe and lens are of a unitary construction.

14. The line-of-light illuminating device of claim 13 wherein said lightpipe and lens are formed together in a single injection molding process.

15. The line-of-light illuminating device of claim 14 wherein said emission portion of said main body of said lightpipe and said lens have a unitary teardrop cross-sectional shape.

16. The line-of-light illuminating device of claim 14 wherein said emission portion of said main body of said lightpipe and said lens have a unitary snow cone cross-sectional shape.

17. The line-of-light illuminating device of claim 13 wherein said integral lens is a single segment of a cylindrical lens.

18. The line-of-light illuminating device of claim 13 wherein said reflective surface on said main body of said lightpipe has the configuration of an elongated thin line.

19. The line-of-light illuminating device of claim 19 wherein said emission portion of said main body of said lightpipe is grooved and metallized to form said reflective surface.

* * * * *